Oct. 22, 1968     W. L. WISTING     3,406,498
AIR TREATING APPARATUS

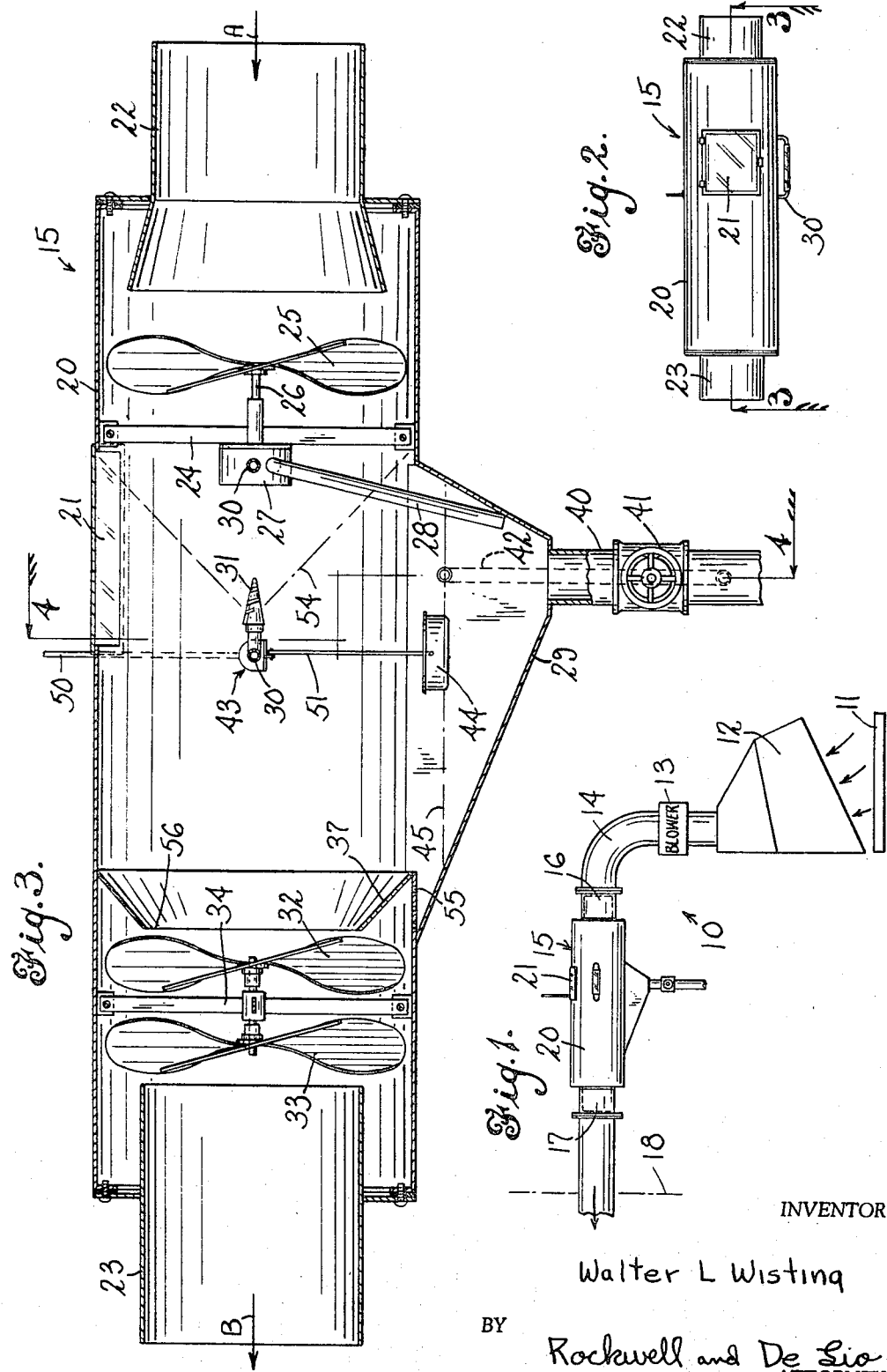

Filed May 17, 1965     3 Sheets-Sheet 2

INVENTOR
Walter L. Wisting
BY Rockwell and De Lio
ATTORNEYS

INVENTOR
Walter L. Wisting

United States Patent Office 3,406,498
Patented Oct. 22, 1968

3,406,498
AIR TREATING APPARATUS
Walter L. Wisting, Madison, Conn., assignor to Cen-Trific-Air Products, Inc., New Haven, Conn.
Continuation-in-part of application Ser. No. 381,178, July 8, 1964. This application May 17, 1965, Ser. No. 461,587
11 Claims. (Cl. 55—227)

ABSTRACT OF THE DISCLOSURE

Gas treating apparatus including a casing having inlet and outlet openings. A scrubber fan is rotatably mounted adjacent the inlet opening and driven by gas flow into the casing. Liquid is sprayed onto the blades of the scrubber fan while its speed of rotation is controlled to establish a moving screen of liquid between the blades thereof. The eliminator fan is rotatably mounted adjacent the outlet opening and is freely driven by gas flow impinging thereon and centrifugally throws liquid particles to the walls of the casing.

---

This invention relates to apparatus for treating air, and more particularly relates to apparatus for washing or scrubbing air to remove contaminants therefrom, and also to provide heat exchange between a gas and a liquid. This application is a continuation-in-part of co-pending application, Ser. No. 418,379 filed Dec. 4, 1964 now abandoned which is a continuation-in-part of application, Ser. No. 381,178, filed July 8, 1964, now abandoned..

The invention has various applications in treating air and utilizing gas to exchange heat with a liquid. The invention may find wide application in apparatus designed to remove contamination such as dust, acid fumes, grease, etc. from air and will primarily be disclosed in such environment.

Air washers, also referred to as air "scrubbers" and dust and fume collectors, are known which are utilized to wash or scrub air to remove contamination therefrom by producing movement of the air through a chamber while spraying water into the air which collects or combines with the contaminants therein. The water particles are then carried by the moving air stream to some device or structural arrangement, such as filters or impingement baffles, which block or hamper passage of the heavier water particles while allowing passage of air. In some arrangements, the flow of air is caused to change direction so that the heavier water particles will continue in their direction of flow to an accumulator or sump.

These types of air washers using a tortuous air flow path, impingement baffles or filters to remove the water from the air have a common deficiency in that all the aforementioned arrangements produce an undesirable static head of pressure or pressure drop which requires the use of a larger air moving means to compensate for the pressure drop, or overcome the static head. Additionally, the known air-washers generally do not provide a means of recovering or reusing the contaminated water without the provision of an elaborate water purifying system. In some instances a rotating fan has been used to eliminate water from the air as the water-laden air exits the air washer. For the most part such fans have required especially designed blades with water troughs or gutters thereon designed to catch the water entrained in the air, and prevent escape of the entrained water from the air washer. Such water eliminators have not proven efficient in preventing the exit of water from the device.

The present invention provides a new and improved air treating device which overcomes or greatly minimizes the aforementioned deficiencies and limitatons of presently known air washers. An air washer embodying the present invention suffers only a minimal static pressure drop through the air washer and minimizes water consumption. A unit embodying the invention includes means for establishing a dynamically moving screen of liquid droplets or particles through which air to be treated must move, and prolonging the existence of such screen to maximize the exposure of the liquid to the air. The screen thus established comprises high velocity droplets in a high concentration.

A unit embodying the invention is completely self-contained and may be readily placed in an existing air cleaning system or incorporated in a new system. It may be designed for installation in either a vertical or horizontal arrangement to provide an overall linear flow of air therethrough. Moreover, a unit embodying the invention my be so constructed as to require no drive means within the unit and operate solely in response to air flow therethrough.

An object of this invention is to provide a new and improved device of the type described which is useful for washing air to remove contaminants therefrom and also for cooling or heating air or liquid.

Another object of this invention is to provide a new and improved device of the type described which is efficient in operation and requires no air filters, static impingement baffles nor tortuous gas-liquid separating passages.

Another object of this invention is to provide a new and improved air treating apparatus in which a dynamically moving screen of liquid is established in a new and improved manner and gas to be treated must move through such screen.

Another object of this invention is to provide a new and improved air treating apparatus which maximizes exposure of air to liquid and provides a high concentration of dynamically moving liquid droplets through which the air must pass.

Another object of this invention is to provide a device of the type described which consumes but little water.

Another object of this invention is to provide a new and improved device of the type described which may be easily installed in an existing section of duct without the necessity of complex fittings.

A further object of this invention is to provide a new and improved device of the type described wherein the moisture-laden air drives a fan which efficiently centrifugally separates the moisture from the air without establishing an undesirable static head of pressure and discharges clean air.

The features of the invention which are believed to be novel are set forth with particularity and distinctly claimed in the concluding portion of this specification. However, the invention both as to its organization and operation, together with further objects and advantages thereof, may best be appreciated by reference to the following detailed description taken in conjunction with the drawings, in which:

FIG. 1 is a view in elevation of an air treating system including a unit embodying the invention;

FIG. 2 is a plan view of the air treating unit of FIG. 1;

FIG. 3 is a longitudinal sectional view of the unit of FIG. 2, seen along section 3—3 of FIG. 2;

Figure 4:
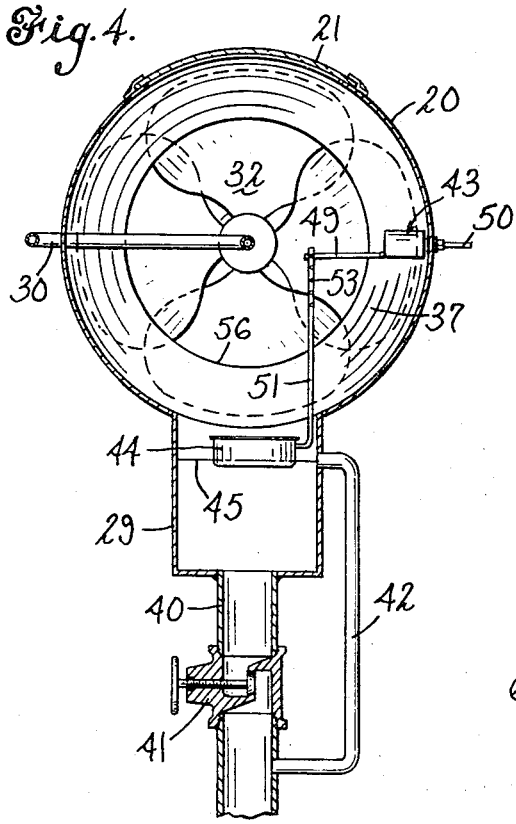
FIG. 4 is a cross-sectional view of the unit of FIGS. 2 and 3 seen along section 4—4 of FIG. 3.

An air washing or cleaning sytem 10 which may include a unit embodying the invention is generally illustrated in FIG. 1. The reference numeral 11 represents the top of an acid vat or bath. A hood 12 is positioned above the vat and the fumes therefrom are drawn up into the hood by a blower 13 in conduit or duct 14. An air washing unit 15 embodying the invention is positioned in duct 14 through suitable couplings 16 and 17. The duct 14 may then be directed through an exterior wall represented by the broken line 18.

The air washer exemplified in FIGS. 1-4 is arranged for horizontal installation and generally comprises a substantially cylindrical casing 20 having a length substantially greater than its diameter and having a transparent access and inspection door 21 therein which is also useful as an observation window for purposes hereinafter described. Air to be cleaned, represented by the arrow A, is directed into the casing at the inlet end thereof through an inlet conduit and mounting adaptor member 22, and clean dry air is exhausted through the outlet end through an outlet conduit and mounting adaptor 23 as represented by the arrow B. Both of conduits 22 and 23 are of lesser diameter than casing 20 and extend therein. Within the casing is a mounting bracket 24 preferably having four legs which rotatably mounts a first fan 25 having a plurality of blades extending radially therefrom. Fan 25 is positioned adjacent the inlet opening and is arranged to be driven by air flow through the unit. The span of the blades of fan 25 is greater than the diameter of conduit 22. Fan 25 rotates in a plane substantially perpendicular to the flow of air through the unit. The shaft 26 of fan 25 drives a pump 27 also carried by bracket 24. When pump 27 is operated it draws water through pipe 28 from reservoir or sump 29 which is positioned at the bottom of the cylindrical casing intermediate the ends thereof in open communication with the interior of casing 20. Pump 27 then supplies water under pressure through conduit or pipe 30 to a spray nozzle 31 which directs a mist or spray of particles of water into the incoming air stream and onto the blades of fan 25. The water droplets striking the blades of fan 25 move from one blade to the next as the fan rotates, and outwardly toward the casing by centrifugal action, as hereinafter explained. This creates a moving water fall or screen of water drops or mist between the blades through which the incoming air must pass. Positioned adjacent the outlet end of casing 20 are fans 32 and 33 rotatably mounted from a bracket 34, similar to bracket 24. Fans 32 and 33 rotate in a plane substantially perpendicular to the impinging air flow. While two fans 32 and 33 are illustrated adjacent the exhaust openings it will be understood that one fan is usually sufficient. As seen in FIG. 4 the blades of fan 32, and also the blades of fan 33, are wide and in overlapping relationship so as not to provide a straight-through open path through the fan. The span of the blades of fan 32 is greater than the diameter of outlet conduit 23. A baffle 37 having a generally frusto-conical configuration is positioned within casing 20 immediately before fan 32. Baffle 37 covers the open spaces between the fan blades toward the outer extremities, see FIG. 4 and provide a means of increasing the velocity of air flow in casing 20 prior to the eliminator fans, and therefore increase the velocity of the air impinging on fan 32. At the exhaust end of casing 20 there is positioned an outlet conduit and adaptor 23 arranged to receive coupling members so that the unit 15 may be coupled into a duct as represented by the duct 14, FIG. 1. The adaptors 22 and 23 are preferably coaxial with each other and with casing 20 to provide a generally linear overall path through the unit and minimize any pressure drop and build-up of a static pressure head. As illustrated, the inlet and outlet openings and also the opening in baffle 37 are all essentially the same.

Sump 29 is in open communication with the interior of casing 20 and has a drain pipe 40 connected thereto which includes a normally closed valve 41. As most clearly seen in FIG. 4 an overflow pipe 42 is provided in communication with sump 29 and bypasses valve 41 to drain pipe 40.

Figure 5:
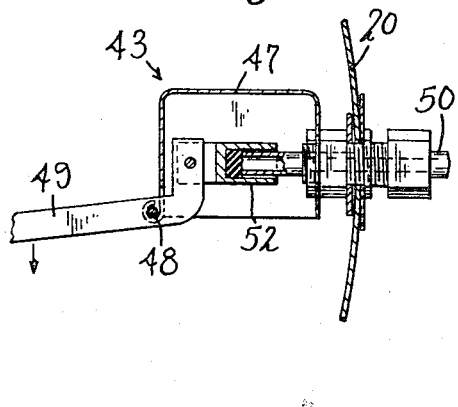
FIG. 5 is a view, in section, of a float operated valve utilized in a unit embodying the invention.

Means are provided to replenish and freshen the water in the sump 29 and allow the sump water to be continually changed to avoid undesired build-up of contamination. The last-mentioned means comprise float valve 43 and an actuating float 44. As most clearly shown in FIG. 5, valve 43 comprises a casing 47 which carries a pin member 48 about which is pivoted a lever 49. A lead-in pipe 50 from a fresh water supply (not shown) is suitably mounted on casing 20 and supports casing 47. Lever 49 is connected to a float stem 51 so that as float 44 rises or falls, stem 51 will pivot lever 49 about pin 48 and open or close valve portion 52. Assuming that the water level 45 falls, float 44 will follow the water level and turn lever 49 counterclockwise about pin 48 as indicated by arrow E causing valve portion 52 to open inlet pipe 50, and allow fresh water from the fresh water supply to spill into sump 29 to maintain a predetermined water level therein and provide a continuous change of water in sump 29. Lever 49 may be connected to stem 51 at a plurality of positions 53 to predetermine and control the rate at which water in sump 29 is changed. In operation, water in sump 29 will be drawn off through overflow pipe 42 and as float 44 moves downwardly, valve 43 through lever 49 is operated to supply fresh water into the sump. In this manner fresh water is supplied to sump 29 at a predetermined rate, which rate is selected in accordance with the degree of contaminants in the water in sump 29.

Consider now the operation of the unit described assuming that air is to be applied to the inlet end thereof under pressure from a blower 13, FIG. 1, which air contains a contaminant such as acid fumes. The air flow A impinging on fan 25 produces rotation thereof and has imparted thereto a helical component of motion, yet no appreciable static head of pressure is built up at the entrance to the unit. The blades of fan 25 are constructed similar to those of fan 32. As fan 25 is rotated it drives pump 27 which in turn draws water from sump 29 through pipe 28 and supplies water under pressure to nozzle 31. Nozzle 31 sprays water onto the blades of fan 25. As fan 25 rotates, fine drops of water are thrown from blade-to-blade and outwardly toward the casing to create a dynamically moving waterfall or screen through which the air to be washed must pass. As the contaminated air passes through this waterfall, the water particles combine with the air borne contaminants or fumes. The air passing fan 25 has imparted thereto a circular or helical component of motion which it retains moving through the spray from nozzle 31. Nozzle 31 produces a mist or spray of small particles of water generally indicated by the broken outline 54. The helical movement of air into the mist ensures greater exposure of the air to the water particles and more efficient combination of the water particles with contaminants carried by the air. Additionally, the velocity of the air decreases in the larger diameter casing 20. The particles of water in the mist combine with the acid fumes in the incoming air flow. The continuing air flow through casing 20 passes through baffle 37 which increases the velocity thereof and impinges on fan 32. The air flow impinging on the blades of fan 32 drives fan 32 at a speed proportional to the velocity thereof. The particles of water in the air which have collected the acid, on striking the blades of fan 32 are thrown off onto the inner walls of casing 20 and drain back to sump 29 through drain holes 55. Fan 32 and also 33 have no load thereon and operate at a very high speed. The washed or cleaned air with the acid fumes removed therefrom is then directed outwardly of casing 20 through outlet conduit 23.

It will be noted from observation of FIG. 4 that the blades of fan 32 essentially cover the opening 56 in baffle 37 and thereby prevent straight-through motion of contaminated air. Therefore, the air laden with small particles of water impinges on the blades of fan 32 and, being heavier than the air, are thrown off onto the walls of casing 20 due to the centrifugal force exerted thereon upon rotation of the fan blades, while the lighter air is directed past the fans. It will be understood that if desired fans 32 and 33 could be so positioned that their blades were 90° displaced and completely block the see-through openings between the blades near the hub of the fan. However, in view of the relatively small size of these openings as compared to the overall area of opening 56, this is not deemed necessary. Additionally, the fans 32 and 33, being free wheeling, may operate at very high speeds on the order of three thousand revolutions per minute, dependent of course on the velocity of the air impinging thereon.

It is understood, of course, that the fan 32, and also fan 33, are driven by the flow of air through casing 20 which impinges on the blades thereof. All fans are mounted in the cylindrical casing with their axes of rotation substantially parallel to the overall direction of air flow through casing 20. It has been found in practice that a four-bladed fan having overlapping blades, as illustrated, and a blade pitch of substantially 23° gives the most satisfactory results.

The water particles flung from the blades of fans 32 and 33 could have a tendency to creep toward the outlet conduit under the influence of the air flow if it were not of decreased diameter and extending into casing 20 to provide an annular pocket or trap which collects water. The water thus collected drains back to the sump through drain holes 55.

It has been determined that more efficient operation is attained by constructing the eliminator fans to be free-wheeling rather than positively driven by a motor or belt drive. The eliminator fans rotate at a very high speed proportional to the velocity of air flow through the casing, which speed is in most instances higher than is obtainable from a direct motor drive. Moreover, the disclosed construction does not require any fan drive means within the unit.

The water which drains back to the sump from casing 20 contains the contaminant removed from the air introduced into the unit 15 and would tend to contaminate the water in sump 29. It has been found that in most instances the contaminants will either tend to float on the top of the water in sump 29 and be drawn off through drain pipe 42, or sink to the bottom of the sump. As previously explained, as water is drawn off through drain pipe 42 fresh water is introduced through valve 43 to replenish that drawn off and in this manner maintain the water in sump 29 at an acceptable degree of purity or freshness. Also, as previously pointed out, the rate at which the water is changed or replenished in sump 29 depends upon the point of connection of lever 49 to float stem 51. If contaminants build up at the bottom of sump 29, valve 41 may be opened and sump 29 drained. This may be accomplished automatically at timed intervals, as hereinafter explained.

It will be apparent that the water in the system may be reused and only make-up water is required during operation of the unit. This presents a substantial savings as compared to air washer units where water cannot be reused but must be removed from the system after being sprayed into the air flow, and also presents a substantial savings in capital investment and maintainence as compared to systems which attempt to filter or otherwise purify water and reuse it.

Water particles from nozzle 31 striking the blades of fan 25 have imparted thereto two velocity components. One velocity component is tangential due to rotation of the blades, while the other velocity component is radial due to the centrifugal force exerted on the particles. Additionally, the water particles striking the fan break into smaller droplets having the same velocity components.

The resultant of these components is in the direction of movement of the fan and radially outwardly. But, the droplets are in the air stream moving in the passages between the fan blades, which air stream thus imparts another velocity component to the particles in a direction generally opposite the direction of rotation of the fan. As a result, the water particles then strike the next fan blade on the back thereof and the above-described motion is repeated until the particles move radially outwardly along succeeding fan blades and are thrown off to the inside of the casing.

It will be apparent that the number of blades an individual droplet of water will strike will be a function of its radial component of motion from blade to blade, and therefore a particle of water initially striking a blade near the hub of the fan will strike a greater number of blades before being centrifugally thrown off the fan, than a water particle initially striking a blade near the end thereof.

This action produces a screen of water particles or waterfall between the blades of the fan which moves in a direction opposed to the direction of rotation of the fan. This screen or waterfall is held in the air for a relatively long period of time and comprises a heavy uniform concentration of water particles through which the entering air must pass. The dynamic energy or velocity of the water particles further adds to the efficiency of the scrubbing action exerted on the air.

Some of the moisture or water particles will be entrained in the air passing the fan and will be carried with the air through the spray area produced by nozzle 31 and any other nozzles therein toward eliminator fans 32 and 34. Movement of the air through the spray area produces further exposure of the air to water and more air scrubbing action. Eliminator fans 32 and 34 are freely rotatable by air flow thereon and rotate at very high speeds. Thus, the moisture particles in the air impinging thereon are centrifugally thrown off onto the walls of casing 20 and drain to sump 29. Baffle 37 serves two related and important functions. It increases the velocity of the air stream impinging on the fan blades and directs the air flow centrally of the fan. It will be apparent that the velocity of the air stream impinging on fan 32 may be increased by decreasing the opening in baffle 37, and vice versa.

Consideration of the velocity components exerted on the water particles reveals that as the speed of the fan is increased the radial velocity component due to the centrifugal forces exerted on the water particles increase. The result is that with increase in fan speed the water particles move radially outwardly a greater distance from blade-to-blade until the fan reaches such speed that the radial velocity component of the water particles is too great to create the blade-to-blade water screen. For air washing or scrubbing efficiency it is preferred to maintain the blade-to-blade water screen of fan 25. However, for heat exchange applications, as hereinafter described, the higher fan speeds may be utilized.

In the unit illustrated in FIGS. 3 and 4, the pump 27 provides a load on fan 25 and limits the rotational speed thereof to create and maintain the blade-to-blade water screen. If an external pump is used, other means as hereinafter described, may be provided to limit the speed of fan 25. If desired, a spray nozzle could be placed before the fan and a spray directed thereon to create the water screen between the blades of fan 25.

The invention has thus far been disclosed in a horizontal application for removing acid fumes from air. The invention may also be embodied in an air washer arranged for a vertical installation.

Figure 6:
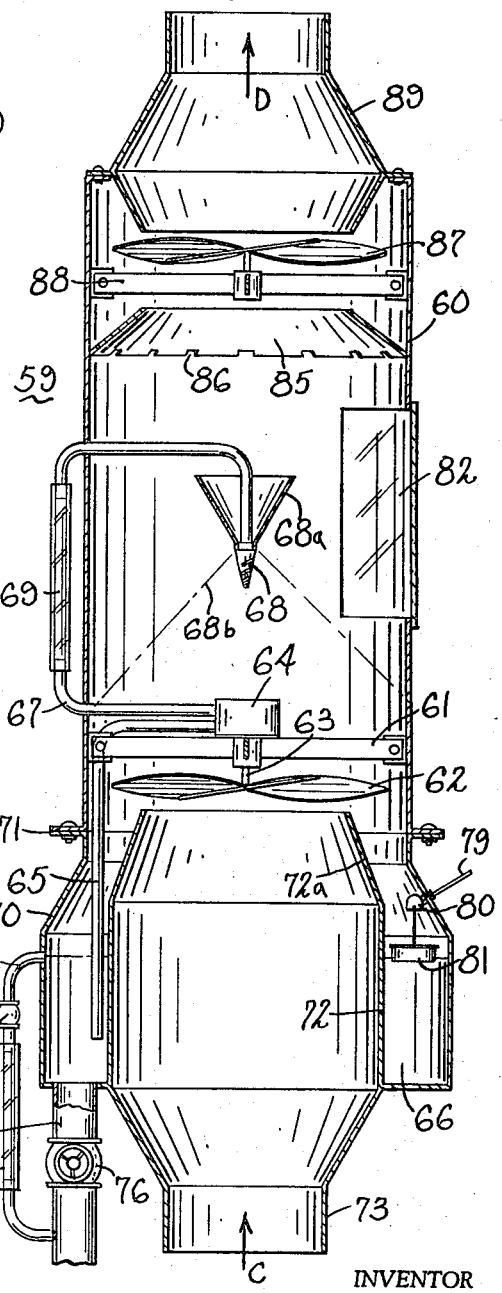
FIG. 6 is an elevation in half section of an air washer unit embodying the invention which is arranged for a vertical installation.

An air washer arranged for a vertical installation is shown in FIG. 6 and comprises a cylindrical casing 60 having mounted therein a bracket 61 which rotatably supports a fan 62 thereon of the same configuration shown in FIG. 4. The shaft 63 of fan 62 drives a pump 64 which draws water through pipe 65 from reservoir or sump 66 and delivers the water to pipe 67 to spray or nozzle 68. Pipe 67 may be provided with a transparent sight portion 69 which is used to determine if the pump is operating. Optionally mounted on nozzle 68 is an impingement cone 68a, for purposes hereinafter described. The sump 66 is annular in shape and is partially defined by casing member 70 secured to casing 60 as at 71. Mounted within member 70 and further defining sump 66 is an inlet duct or conduit 72 providing a coupling mounting adaptor 73 similar to adaptors 22 and 23. Fan 62 is positioned immediately behind inlet duct 72 and the span of the blades thereof is greater than the diameter of the inlet conduit. Sump 66 is provided with a drain pipe 75 having a normally closed valve 76 therein similar to the arrangement shown in FIG. 3. An overflow pipe 77 bypasses valve 76 and may be provided with a sight glass 78. A valve 77a may be included in overflow pipe 77 to control the rate of overflow and therefore the rate at which fresh water is admitted. Fresh water may be admitted to sump 66 through an inlet pipe 79 controlled by a valve 80 actuated by float 81. In the same manner as previously explained in conjunction with FIGS. 3–5, casing 60 is provided with a covered opening 82 which may be transparent for inspection purposes. Mounted towards the exit end of casing 60 is a baffle 85 of frusto-conical shape having apertures or notches 86 at the large diameter thereof for purposes hereinafter explained. A fan 87 is rotatably mounted on a bracket 88 carried by casing 60. Fan 87 is of the same configuration as fan 32 shown in FIG. 4 and baffle 85 is for the same purpose as baffle 37, FIGS. 3 and 4. A discharge conduit and mounting adaptor 89 is mounted to casing 60 subsequent to fan 87.

The operation of air washer 59 is substantially similar to that of air washer 15. Air to be washed is forced or drawn in through conduit 72 as indicated by the arrow C and clean dry air is exhausted as represented by the arrow D. The air flow C impinging on fan 62 has substantially no straight-through path by virtue of the overlapping arrangement of the fan blades, and baffle 72a. Therefore, the air flow into casing 60 drives fan 62 and in turn drives pump 64 which supplies water to nozzle 68. Nozzle 68 produces a spray of fine drops of water as indicated by the lines 68b into the oncoming air flow and onto the blades of fan 62. The water droplets striking the blades of fan 62 are thrown from blade-to-blade and outwardly to the wall as previously described. This creates a rotating screen of water particles through which air entering the casing must pass. The tiny particles of water combine with or collect the contaminants in the air flow. The water particles which strike fan 62 are eventually centrifugally thrown off from the blades of fan 62 onto the interior walls of the casing and will run down to sump 66. The moisture-laden air in continuing through casing 60 impinges upon the blades of fan 87, thereby rotating fan 87. The moisture particles striking the fan are centrifugally thrown off onto the interior walls of the casing and drain down the walls through apertures or recesses 86 to sump 66. The rate of change of water in sump 66 is controlled as previously explained in conjunction with FIGS. 3, 4 and 5 by overflow pipe 77 and valve 80, and also by valve 77a. The impingement cone 68a is provided to collect any dust or contaminants which do not combine with the air. This feature of construction is optional. When used the impingement cone is placed on a direct line with the pump 64 which may produce a "blind" area therebehind. Conduit 89 extends into casing 60 for the same reasons as described in conjunction with conduit 23.

Figure 7:
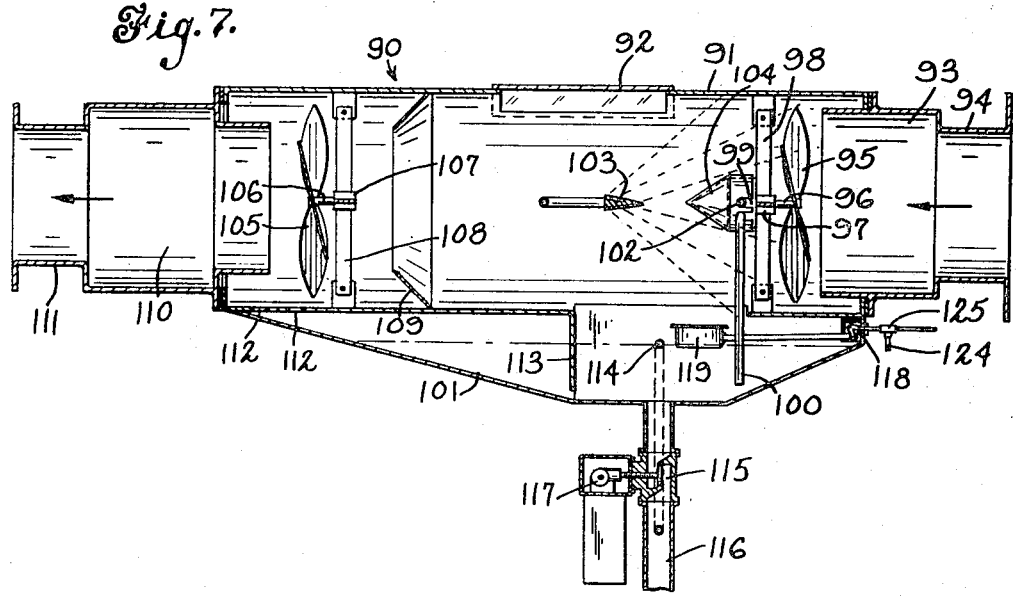
FIG. 7 is a view, similar to FIG. 3, of another air washer unit embodying the invention.

Another and preferred air washer 90 embodying the invention is shown in FIG. 7, and comprises a cylindrical casing 91 which may have an inspection hatch 92 therein. Mounted to casing 91 and extending therein is an inlet conduit and connection adaptor 94 extending into a larger diametric portion 93, which extends within casing 91. A first fan 95 is disposed immediately adjacent conduit 93 and has a shaft 96 rotatably mounted in journal means 97. The shaft mounting is supported by a bracket 98 from the side walls of casing 91. The shaft of fan 95 drives a pump 99 which through pipe 100 draws water from sump 101 in a manner previously explained and supplies water under pressure through pipe 102 to spray nozzle 103. Nozzle 103 is constructed and arranged so as to spray drops of water onto the back surfaces of the blades of fan 95, and into the incoming air stream as represented by the dashed lines. A conical member 104 may be positioned on pump 99 to direct water sprayed thereon and disperse over a 360 degree area onto the blades of fan 95. Mounted at the opposite end of the casing is an eliminator fan 105 having a shaft 106 rotatably mounted in journal means 107 supported from brackets 108 extending radially inwardly from the sides of casing 91. A baffle 109 is disposed before fan 105 for purposes heretofore described. An outlet conduit 110 having a connector portion 111 of essentially the same diameter as inlet conduit 94 and the opening in baffle 109 is mounted to casing 91. An outlet conduit of lesser diameer than conduit 110 extends into casing 91. Apertures 112 are provided in the bottom of casing 91 in the vicinity of fan 105 to allow the water particles thrown off from fan 105 to drain back to sump 101.

It will be noted that the sump 101 extends essentially the entire length of casing 91, and casing 91 is provided with a large opening or orifice providing open communication between the casing and the sump. Baffle 113 extends downwardly below the normal water level into sump 101 for purposes hereinafter described. The sump is provided with an overflow pipe 114 bypassing valve 115 to drain pipe 116. In the arrangement shown in FIG. 7, valve 115 is arranged to be opened periodically for a predetermined interval of time by a timing motor 117, which will open valve 115 for a period of a few seconds, say, every one-half hour to allow accumulated foreign matter in sump 101 to be drained off. The time for which the valve is opened is so selected that the sump will not drain to a level below pipe 100. Suitable valve actuating and timing motors are available from New England Gear Works, Inc., Southington, Conn. In FIG. 7 water input is through a valve 118 operated by float 119.

Figure 8:
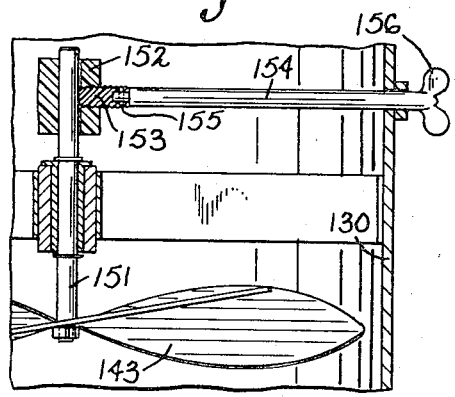
FIG. 8 is a view, in half section, of a detail of construction of a unit embodying the invention.

As shown in FIG. 8, a brake actuatable from without the casing may be applied to the shaft of the first fan to limit the speed thereof. As illustrated, the shaft 151 of a fan 143 may have applied thereto a sleeve 152, preferably of a material which provides little frictional resistance to rotation of shaft 151, such as tetrafluoroethylene. Sleeve 152 receives a threaded pressure member 153 therein, which is also preferably of tetrafluoroethylene, and which is secured to a shaft 154 as by means of a pin 155. Shaft 154 extends without casing 130 and may have a handgrip 156 thereon to facilitate turning of shaft 154. Thus, as shaft 154 is turned to increase the pressure between member 153 and shaft 151, a load will be placed on the shaft to decrease the speed of the fan. In this manner the speed of rotation of fan 143 may be controlled or limited. The braking means shown in FIG. 8 may be utilized in applications where the pump which draws water from the sump and supplies it to the spray nozzles is externally mounted of the casing and there is no other load on the shaft of the fan. It will be understood that the brake shown in FIG. 8 is exemplary only and various types of brakes or other friction devices may be utilized to limit and control the speed of the shaft of fan 143.

A unit embodying the invention may be constructed to include a means for moving air therethrough. For example, the blower 13 of FIG. 1 may be coupled to either the inlet or outlet conduit through the use of flanged couplings 16 and 17, FIG. 1. In fact, where a unit embodying the invention is going to be put in a new installation, this may be preferable, while in an existing installation which includes its own air-moving means, such as blower 13, it would not be necessary to provide an additional blower. It is preferable to place the blower and its motor on the outlet end of the unit in order that it will not be exposed to the contamination of the entering air. In co-pending application, Ser. No. 456,432, now U.S. Patent 3,336,733, of Walter L. Wisting, filed on the same date as this application, and assigned to the same assignee as the present invention, there is illustrated a unit embodying the invention which has an air-moving means in the form of a blower attached directly thereto externally of the unit.

Units embodying the invention are very efficient and compact and may be easily handled and installed either for a new installation or in existing ducts. For example, a unit as illustrated in FIG. 7 having a rating of 1,000 cubic feet per minute is only sixty inches long over inlet and outlet conduits 94 and 111. In this particular model the conduits 94 and 111 have a diameter of eight inches while the portions 93 and 110 have a diameter of eleven and one-half inches and casing 91 has a diameter of thirteen inches. With these dimensions the velocity of the air flow into the unit is 3,000 feet per minute, the velocity of the air flow through casing 91 is 1,100 feet per minute and the velocity of the exiting air is 3,000 feet per minute. A unit rated at 3,000 cubic feet per minute has the same overall dimension of sixty inches, diameters at conduits 94 and 111 of twelve inches, diameters at portions 93 and 110 of thirteen and one-half inches. Entrance and exiting air in the inlet and outlet conduits has a velocity of approximately 4,000 feet per minute and the velocity of air in casing 91 which has a diameter of fifteen inches is approximately 2,500 feet per minute. The unit rated at 1,000 cubic feet per minute has a dry weight of only approximately 85 pounds, and the sump extends approximately five inches below the main casing. All models are so constructed with relation to the volumetric air flow therethrough that the speed of the eliminator fan is very high, on the order of 1500–3000 revolutions per minute. In units such as those described above, it has been found that a satisfactory screen of water is established between the blades of the first fan when the speed thereof is held in the vicinity of 1,000 revolutions per minute.

Tests have further shown that in dust collection a unit embodying the invention has been effective to remove particles of less than micron size. It is theorized that this is due to the high speed of rotation of the eliminator fan 105, FIG. 7. The eliminator fan, which is free wheeling, rotates at a very high speed and it is theorized that the high speed of rotation and the friction of the blades with the air produces a static electrical charge on the surface of the blades which collects the extremely small particles of dirt or dust which may travel through the scrubber fan and the spray area. Subsequently, it is believed that such small particles of dust which are electrostatically collected on the fan blades are collected by the moisture particles impinging on the blades of the eliminator fan and thrown therefrom with such water particles by the centrifugal force exerted on the water particles by the high speed of rotation of the eliminator fan.

For the most efficient operation, the first or scrubber fan preferably has overlapping blades as shown in FIG. 4 which are pitched between eighteen and twenty-five degrees. This allows the fan to be driven without building up undesired air resistance. Also, the blades then define a passage therebetween for air which imparts to the air a spiraling or helical motion as it moves through the spray zone created by the nozzle(s) to produce a more efficient washing action.

Additionally, the velocity of air flow through the casing is selected in accordance with the volumetric rate (cubic feet/minute) and the size of the unit and the elements thereof so that the air flow impinging on the second or eliminator fan drives this fan at a high speed of rotation to achieve very efficient elimination of water particles from the air.

It will be apparent that the waterfall or water screen created between the blades of the first fan may be utilized to serve many useful purposes as heretofore described, and a unit embodying the invention is very efficient in its operation inasmuch as the air entering the casing is acted upon or acts upon the water in the moving screen immediately upon entering the casing. The air passing the first fan has imparted thereto a helical motion through a water spray zone, thus assuring increased exposure of the water to the air and vice versa. The air then moves on down the casing at decreased velocity due to the increased diameter of the casing to the eliminator fan which separates the finer particles of water carried by the air from the air. The distance between the first fan and the eliminator fan is preferably so chosen that the heavier particles of water will be out of the air stream by the time the air stream reaches the eliminator fan. It may be used to remove fumes from the air as specifically described. Also, it may be used to efficiently remove dust from the air, or to cool air or to cool water. Additionally, it may be used as an air cooler installed in front of air utilizing equipment to supply clean, dust-free air and thus eliminate static filters. It also may be so utilized that the exhausted clean air is retained within the building in which it is installed.

A device embodying the invention has low operating and maintenance costs and is extremely efficient in operation. The water or other liquid consumption is low. The rate of change of liquid in the system may be predetermined in accordance with the degree of contamination of the air to be treated. Inasmuch as there are no static elements, such as static impingement baffles, filters, etc. the static pressure drop in the unit is very low.

It may thus be seen that the objects of the invention set forth as well as those made apparent from the foregoing description are efficiently attained. While preferred embodiments of the invention have been set forth for purposes of disclosure, modification to the discolsed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

The embodiments of the invention in which an exclusive property or privilege is claimed are defined as follows:

1. Gas treating apparatus comprising a casing having inlet and outlet openings at opposite ends thereof, said inlet and outlet openings being defined by coaxial inlet and outlet conduits extending axially into said casing, said conduits being of lesser transverse dimension than said casing, first and second fans, said fans having radially extending blades so as to provide paths for gas therethrough transverse to the axis of rotation of said fans, said blades spanning a dimension greater than the dimension across said conduits adjacent said fans, said first fan being rotatably mounted in said casing adjacent said inlet opening and rotatable solely by gas flow impinging thereon from said inlet conduit, means for spraying liquid onto the blades of said first fan as it is rotated so that the water striking the blades of said first fan is broken into small particles, means for limiting the speed of said first fan so that liquid particles impinging on the blades have a substantial tangential component of velocity imparted thereto and move from blade-to-blade thereof to create a moving screen of liquid between the blades of said first fan, said second fan being rotatably mounted in said casing adjacent said outlet conduit and arranged to be driven solely by gas flow through said casing impinging thereon, said second fan being effective to centrifugally throw liquid particles impinging thereon to the walls of said casing, means for collecting liquid thrown from said fans onto said casing, and means for moving gas to be treated through said casing.

2. The apparatus of claim 1 wherein said means for collecting liquid comprises a sump in open communication with said casing, and means for drawing liquid from said sump and supplying it to said spray means.

3. The apparatus of claim 2 wherein said means for drawing comprises a pump driven by said first fan and said pump comprises said means for limiting the speed of said first fan.

4. The apparatus of claim 2 further including means for simultaneously adding and removing liquid in said sump at predetermined rates.

5. The apparatus of claim 2 wherein said means for spraying liquid is positioned in said casing adjacent and downstream of said first fan and the gas passing between the blades of said first fan also passes through a liquid spray created by said means for spraying.

6. An apparatus for treating gas comprising a casing having inlet and outlet openings at opposite ends thereof, a fan having a plurality of radially extending blades, said fan being rotatably mounted in said casing adjacent the inlet opening and arranged to be driven solely by gas flow through said inlet opening impinging thereon, means for spraying liquid onto the blades of said fan as it is driven by the gas flow, means for limiting the speed of rotation of said fan so that liquid particles impinging on the blades have a substantial tangential component of velocity imparted thereto and move from blade-to-blade of said fan to create a moving screen of liquid between the blades of said fan, and means for moving gas through said casing.

7. The apparatus of claim 6 wherein said means for spraying is spaced from and positioned substantially coaxial with the axis of rotation of said fan.

8. The apparatus of claim 6 wherein said casing is vertically disposed and said inlet opening is defined by an inlet conduit extending into said casing, wall means cooperating with said inlet conduit to define an annular sump at the lower end of said casing around said inlet conduit, said fan being disposed in said casing immediately adjacent said inlet conduit.

9. The apparatus of claim 6 wherein the blades of said fan are pitched at an angle of substantially 18 to 25 degrees.

10. The apparatus of claim 6 wherein said fan blades are in overlapping relationship defining paths therebetween transverse to the axis of rotation of said fan.

11. Gas treating apparatus comprising an elongated hollow vertically disposed casing having an outlet opening at the upper end thereof and an inlet opening at the lower end thereof, said inlet opening being defined by an inlet conduit extending into said casing at the lower end thereof, said inlet conduit being of lesser transverse dimension than said casing and spaced from the walls of said casing, wall means joined to said casing and defining with said inlet conduit an annular sump around said inlet conduit, means for moving gas through said casing, a fan having a plurality of radially extending blades rotatably mounted in said casing adjacent the opening of said inlet conduit therein so that gas entering said casing impinges on said blades and drives said fan, said blades spanning a dimension greater than the dimension across said opening of said inlet conduit in said casing, means for spraying liquid on to the blades of said fan, means for limiting the speed of rotation of said fan such that liquid particles impinging on the blades have a substantial tangential component of velocity imparted thereto and the particles move from blade-to-blade of said fan to create a moving screen of liquid between the blades of said fan, and means in said casing adjacent said outlet opening for eliminating moisture from the gas passing therethrough, said sump being effective to collect liquid thrown to and running down the walls of said casing.

References Cited

UNITED STATES PATENTS

| | | | |
|---|---|---|---|
| 575,049 | 1/1897 | Bernd | 261—89 |
| 588,530 | 8/1897 | Proctor | 261—90 |
| 621,718 | 3/1899 | Seymore | 261—89 |
| 677,235 | 6/1901 | Kennedy | 261—89 |
| 971,297 | 9/1910 | Miles | 55—228 |
| 1,575,292 | 3/1926 | Tyler | 55—227 |
| 1,673,732 | 6/1928 | Brooks | 55—227 |
| 2,213,881 | 9/1940 | Lauer | 55—403 |
| 2,217,130 | 10/1940 | Niehart | 55—227 |
| 2,326,360 | 8/1943 | Ingersoll | 55—467 |
| 2,527,015 | 10/1950 | Lhota | 261—117 |
| 3,020,974 | 2/1962 | Hungate | 55—230 |
| 3,048,875 | 8/1962 | Bottinelli et al. | 15—301 |
| 3,100,809 | 8/1963 | Baker | 261—117 |
| 3,138,441 | 6/1964 | Krantz | 55—240 |
| 3,192,689 | 7/1965 | Smith | 55—229 |
| 3,191,364 | 6/1965 | Sylvan | 55—401 |
| Re. 20,885 | 7/1933 | Kopsa | 55—403 |
| 538,718 | 5/1895 | Wills | 55—521 |
| 976,081 | 11/1910 | Kinealy | 261—90 |
| 1,951,962 | 3/1934 | Baum | 261—90 |
| 2,387,345 | 10/1945 | Pearl | 55—223 |
| 2,575,359 | 11/1951 | Ortgies | 55—227 |
| 2,601,519 | 6/1952 | Hardy et al. | 55—230 |
| 2,937,712 | 5/1960 | Woods | 261—30 |
| 3,141,750 | 7/1964 | Hungate | 55—257 |

FOREIGN PATENTS

| | | |
|---|---|---|
| 1,493 | 6/1900 | Austria. |

HARRY B. THORNTON, *Primary Examiner.*

B. NOZICK, *Assistant Examiner.*